United States Patent
Kim

Patent Number: 5,923,383
Date of Patent: Jul. 13, 1999

[54] IMAGE ENHANCEMENT METHOD USING HISTOGRAM EQUALIZATION

[75] Inventor: Yeong-taeg Kim, Suwon, Rep. of Korea

[73] Assignee: Samsung Electronics Co., Ltd., Kyungki-Do, Rep. of Korea

[21] Appl. No.: 08/883,707

[22] Filed: Jun. 27, 1997

[30] Foreign Application Priority Data

Jun. 27, 1996 [KR] Rep. of Korea ................. 96-24412

[51] Int. Cl.$^6$ ............................... H04N 5/14
[52] U.S. Cl. ................. 348/672; 348/671; 382/169
[58] Field of Search ................. 348/671, 672; 382/168, 169; 358/522, 455; H04N 5/14

[56] References Cited

FOREIGN PATENT DOCUMENTS 10-32769  2/1998  Japan .

OTHER PUBLICATIONS

J.S. Lim, "Two–dimensional Signal and Image Processing," Prentice Hall, Englewood Cliffs, New Jersey, 1990.
R.C. Gonzalez and P. Wints, "Digital Image Processing," Addison–Wesley, Reading, Massachusetts, 1997.

Primary Examiner—Sherrie Hsia
Attorney, Agent, or Firm—Sughrue, Mion, Zinn, Macpeak & Seas, PLLC

[57] ABSTRACT

In an image enhancement method is disclosed using a histogram equalization for an input image expressed in a predetermined number of gray levels. While calculating the probability density function of the gray levels of the input image, for use in a histogram equalization, the number of occurrences of each gray level are constrained not to exceed a predetermined value. Then a histogram equalization is performed on the input image based on the calculated probability density (or distribution) function. As a result, the mean brightness of the input image does not change significantly by the histogram equalization. Additionally, noise is prevented from being greatly amplified.

7 Claims, 2 Drawing Sheets

IMAGE ENHANCEMENT METHOD USING HISTOGRAM EQUALIZATION

BACKGROUND OF THE INVENTION

1. Field of the Invention

The present invention relates to an image enhancement method. More particularly, it relates to an image enhancement method using a histogram equalization.

This application for an image enhancement method using histogram equalization is based on Korean Patent Application no. 96-24412 which is incorporated herein by reference for all purposes.

2. Description of the Related Arts

In general, the distribution of gray levels in a given input image is referred to as a histogram. The histogram of gray levels provides an overall description of the appearance of the input image. Proper adjustment of gray levels for a given image can enhance the appearance or contrast of the image.

Among the many methods for contrast enhancement, the most widely known one is the histogram equalization, in which the contrast of a given image is enhanced according to the sample distribution thereof. The method is disclosed in documents: [1] J. S. Lim, "Two-dimensional Signal and Image Processing," Prentice Hall, Englewood Cliffs, N.J., 1990, and [2] R. C. Gonzalez and P. Wints, "Digital Image Processing," Addison-Wesley, Reading, Mass., 1977.

Also, the useful applications of the histogram equalization method for medical image processing and radar image processing are disclosed in documents: [3] J. Zimmerman, S. Pizer, E. Staab, E. Perry, W. McCartney and B. Brenton, "Evaluation of the Effectiveness of Adaptive Histogram Equalization for Contrast Enhancement," IEEE Transaction on Medical Imaging, pp. 304–312, December. 1988, and [4] Y. Li, W. Wang and D. Y. Yu, "Application of Adaptive Histogram Equalization to X-ray Chest Image," Proc. of the SPIE, pp. 513–514, vol. 2321, 1994.

In general, since histogram equalization causes the dynamic range of an image to be stretched, the density distribution of the resultant image is made more flat and the contrast of the image is enhanced as a consequence.

However, such a widely-known feature of the histogram equalization becomes a defect in some practical cases. In particular, the mean brightness of the image may change significantly as a result of the equalization. Furthermore, noise in the image is equalized along with the image signal. This may cause the noise to be greatly amplified, which deteriorates the quality of the image. Such problems typically occur when the input samples in the image are concentrated in a few gray levels.

SUMMARY OF THE INVENTION

It is an object of the present invention to provide an image enhancement method using a histogram equalization, by which the mean brightness of an image does not change significantly.

In order to achieve the above object, there is provided an image enhancement method using a histogram equalization for an input image expressed in a predetermined number of gray levels, comprising the steps of (a) calculating a distribution of gray levels of the input image while constraining a number of occurrences of each gray level to be within a predetermined value; and (b) performing a histogram equalization on the input image based on the calculated distribution of gray levels obtained in the step (a).

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Prior to the description of an image enhancement method using a histogram equalization according to the present invention, a typical histogram equalization will be explained briefly to enhance understanding of the present invention.

A given discrete image $\{X\}$ is composed of L discrete gray levels $\{X_O, X_1, X_{L-1}\}$, where $X_O$ corresponds to a black level, and $XL_{-1}$ corresponds to a white level.

A probability density function (PDF) is defined as follows:

$$p(X_k) = \frac{n_k}{n}, \text{ for } k = 0, 1, ..., L-1 \tag{1}$$

where $0 \leq p(X_k) \leq 1$, L is the number of levels, $p(X_k)$ denotes a probability of k-the gray level $X_k$ in the image $\{X\}$, $n_k$ is the number of occurrences of samples having the gray level $x_k$ in the image $\{X\}$, and n is the total number of samples in the image $\{X\}$.

A cumulative density function (CDF) is defined as follows:

$$c(X_k) = \sum_{j=0}^{k} p(X_j), \text{ for } k = 0, 1, ..., L-1 \tag{2}$$

where $C(X_{L-1})=1$.

Based on the CDF, an output Y of the histogram equalization is given by the following equation (3).

$$Y = C(X_k) X_{L-I} \tag{3}$$

One step for applying a histogram equalization is to calculate the PDF of a given image. A conventional method of calculating the PDF for applying to the histogram equalization is depicted in FIG. 1.

Figure 1:
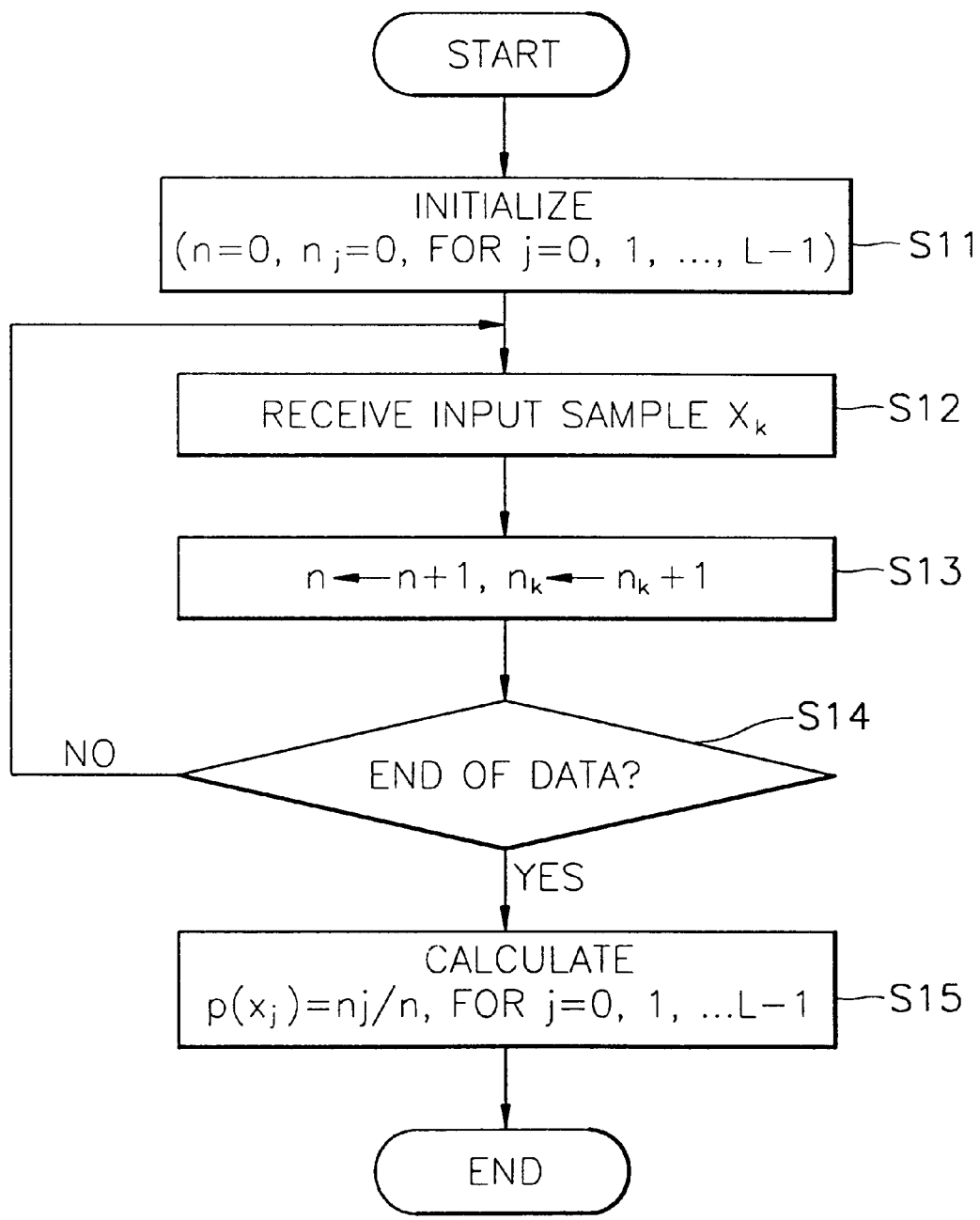
FIG. 1 is a flowchart illustrating a conventional method of calculating the probability density function of an image.

In FIG. 1, the number of total samples n and the number of occurrences of samples having the gray level $X_j$ (j=0, 1, ..., L−1) in the image, $n_j$, are initialized. That is, all of n and $n_j$ (j=0, 1, ..., L−1) are set to 0 (step S11). Whenever a sample $X_k$ is received in step S12, the number of total samples n is incremented by 1 along with $n_k$ the number of occurrences of the gray level $X_k$ (step S13). Then, a determination is made as to whether the last sample of the given image is received or not (step S14). If the input sample is not the last one, steps S12 through S14 are repeated. If the input sample is the last one, the PDF $p(X_j)$ of each gray level of the given image is calculated by use of the equation (1) (step S15).

To understand the drawback of the conventional histogram equalization, it is assumed that an input image is composed of three gray levels $X_1$, $X_2$, and $X_3$ among 256 levels. Also, it is assumed that the numbers of occurrences of gray levels $X_1$, $X_2$, and $X_3$ are $n_1=200$, $n_2=9700$ and $n_3=100$, respectively.

Then, the PDF values for each gray levels are as follows:

$p(X_1)=200/10000=0.02$ p($X_2$)=9700/10000=0.97
p($X_3$)=100/10000=0.01

Also, the three gray levels are mapped into levels of 5,247 and 255, respectively, by the histogram equalization according to the equations (2) and (3).

The mean brightness of the image so equalized is given as follows, regardless of magnitudes of the gray levels $X_1$, $X_2$ and $X_3$.

$$(0.02 \times 5)+(0.97 \times 247)+(0.01 \times 255)=242$$

The mean brightness of the equalized image may differ significantly from the mean brightness of the input image. For example, let's assume that $X_1$=10 and $X_2$=30. Then, the level difference of two gray levels before the histogram equalization is 20. However, the level difference becomes 242 after the histogram equalization regardless of the value of $X_1$ and $X_2$. Here, if the level difference before the histogram equalization is due to Gaussian noise, the histogram equalization results in the amplification of the noise.

As described above, one of the most significant problems of the conventional histogram equalization is that the mean brightness between input and output signals differs significantly from each other depending on the PDF.

Furthermore, such a problem is conspicuously prominent when the samples in the input image are concentrated in a group of a few gray levels. Thus, in the present invention, in cases where the samples in the input image are concentrated in a few gray levels, the number of samples in each gray level is maintained below a predetermined number when the PDF is calculated.

Figure 2:
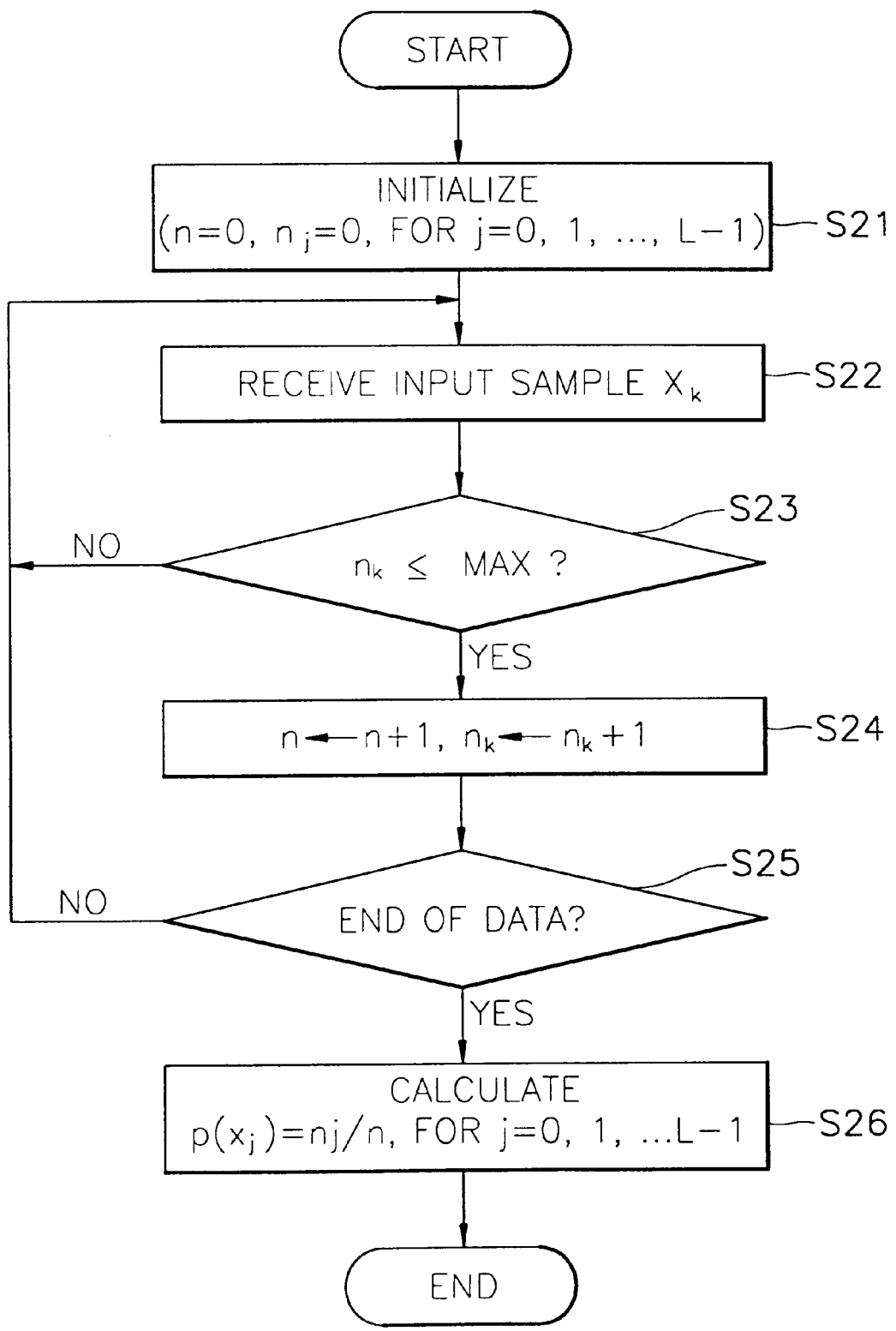
FIG. 2 is a flowchart illustrating a method of calculating the probability density function for use in the histogram equalization method of the present invention.

FIG. 2 is a flowchart illustrating a method of calculating the PDF for applying to the histogram equalization according to the present invention.

First, in FIG. 2, the number of total samples n and the number of occurrences of samples having the gray level $X_j$ (j=0, 1, . . . , L−1) in the image, $n_j$, are initialized. That is, all of n and $n_j$ (j=0, 1, . . . , L−1) are set to 0 (step S21).

Then, an input sample $X_k$ is received (step S22), and a determination is made as to whether the number of occurrences, $n_k$, of the gray level $X_k$ is less than or equal to a predetermined value MAX (step S23).

If it is determined in step S23 that the number of occurrences, $n_k$, of the gray level $X_k$ is less than or equal to a predetermined value MAX, the number of total samples n is incremented by 1 along with the number of occurrences of the gray level $X_k$, i.e., nk (step S24).

However, if it is determined in step S23 that the number of occurrences, $n_k$, of the gray level $X_k$ is greater than the predetermined value MAX, the incrementation step S24 is not carried out but step S22 is carried out so that a next sample is received. As a result, the number of occurrences of each gray level $n_j$ is constrained within the predetermined value MAX.

After the step 24, a determination is made as to whether the last sample of the given image is received or not (step S25). If the input sample is not the last one, steps S22 through S25 are repeatedly carried out. Otherwise, if the input sample is the last one, the PDF p($X_j$) of each gray level of the given image is calculated by use of the equation (1) (step S26).

After the PDF has been calculated, a CDF is calculated based on the PDF. Then, a histogram equalization is carried out for the input image according to a transform function. The transform function is preferably described by the equation (3), but another suitable equation may be used. Any of the number of known transform functions, as well as ones which will be suggested in the future, may be employed in the present invention.

As described above, the image enhancement method using a histogram equalization according to the present invention calculates the PDF considering the concentration of gray levels in the input image. Therefore, the mean brightness of an image does not change significantly by the histogram equalization. Also, the noise is prevented from being amplified greatly.

Although the present invention has been described in terms of a preferred embodiment, it will be appreciated that various changes and modifications may be made to the described embodiment without departing from the spirit and scope of the claimed invention.

What is claimed is:

1. A histogram equalization method for image enhancement by equalizing an input image expressed in a predetermined number of gray levels, the method comprising the steps of:

(a) calculating a probability density function of gray levels of the input image, wherein a number of occurrences of each gray level in the probability density function is constrained to be within a predetermined value; and (b) performing a histogram equalization on the input image based on the probability density function of gray levels calculated in said step (a).

2. The histogram equalization method as claimed in claim 1, wherein said step (a) comprises the steps of:

(a1) comparing a number of occurrences of a gray level of an input sample in the input image with the predetermined value;

(a2) including the input sample in a sample set if the number of occurrences of the gray level of the input sample is less than or equal to the predetermined value and excluding the input sample from the sample set if the number of occurrences of the gray level of the input sample is greater than the predetermined value; and (a3) calculating the probability density function by use of the input samples in the sample set.

3. The histogram equalization method as claimed in claim 2, wherein said step (b) comprises the steps of:

(b1) calculating a cumulative distribution function based on the probability density function calculated in said step (a3); and (b2) performing the histogram equalization on the input image based on the cumulative distribution function calculated in said step (b1).

4. An image enhancement method for use in a histogram equalization of an input image, the input image being expressed in a predetermined number of gray levels, the method comprising the steps of:

(a) initializing a number of total samples in the input image and a number of occurrences of each gray level;

(b) determining whether the number of occurrences of a particular one of the gray levels, which corresponding to a gray level of an input sample in the input image, is less than or equal to a predetermined value;

(c) incrementing both the number of total samples and the number of occurrences of said particular one of the gray levels, if the number of occurrences of that gray level is less than or equal to the predetermined value in said step (b); and (d) determining whether the input image sample is a last one to calculate a probability density function of gray levels of the input image if the input image sample is the last one.

5. The image enhancement method as claimed in claim 4, further comprising the step of (e) excluding the input sample from calculating of the probability density function if the number of occurrences of said particular one of the gray levels, which corresponding to the gray level of the input sample in the input image, is greater than the predetermined value.

6. The image enhancement method as claimed in claim 4, further comprising the step of (f) repeating steps (b) through (d) if the input image sample is not the last one.

7. The histogram equalization method as claimed in claim 3, wherein the histogram equalization performed in said step (b2) is carried out according to a transform function.

* * * * *